Patented Oct. 19, 1943

2,332,221

UNITED STATES PATENT OFFICE 2,332,221

BUILDING MATERIAL AND METHOD OF PRODUCING THE SAME

Norman P. Harshberger, Scarsdale, N. Y., assignor, by mesne assignments, to Carbide and Carbon Chemicals Corporation, New York, N. Y., a corporation of New York No Drawing. Application November 3, 1939, Serial No. 302,672

8 Claims. (Cl. 117—25)

This invention relates to building materials and improvements in weather and ornamental surfacings therefor, and methods of applying said surfacings. The invention is particularly applicable to roofing and siding, generally referred to as composition roofing material, and which has been produced in elements of many sizes and forms, generally referred to as shingles, strip shingles, and roll roofing. The present application is a continuation-in-part as to certain subject matter of my copending application Serial No. 236,789, filed October 24, 1938, which is a continuation-in-part of my Patent No. 2,133,988.

Composition roofing is generally composed of a foundation layer or base, usually a felted fibrous layer made up of rag and paper stock and/or asbestos fiber. This layer is usually saturated and impregnated with a waterproofing substance such as a bituminous compound, for instance, a low melting point asphalt (about 150° F.) generally used at between 225° to 400° F. It is then usually further coated on one or both of its faces, also its edges, with a higher melting point bitumen, for instance, a 220° F. melting point asphalt generally applied at about 450° F. Moreover, the bitumen coating has customarily had bonded thereto, to further protect the roofing where exposed or to act as a parting means between adjacent layers in manufacture and storage, a layer of comminuted mineral material, for instance, slate, crushed tile, etc.

Among the comminuted substances utilized have been mica flakes of the type generally referred to as white mica, the flakes comprising splittings or larger sections of mica or mica derived from mica rock. Each flake usually comprises many membranous layers, has an irregular shape, is of variable thickness, and has edges of irregular fracture making the laminated structure of the flake visually discernible. White mica flakes, in fact, nearly all mica flakes, are transparent or translucent. They therefore transmit light and may serve as a multiplicity of lenses where applied as a surfacing upon roofing. The principal use of mica for composition roofing has been as a parting material to prevent bond of adjacent layers of stacked shingles or as a filler in bituminous mastic coatings. To a limited extent, mica has been used as an exposed surfacing for roll material.

Mica flakes have many advantages for composition roofing. It is possible to anchor the flakes to thin layers of coating material without piercing the layer and provide better coverage than could be obtained with the usual roofing granules. The flakes orient themselves in flattened planes and overlap each other to produce an alligator-like surface. Mica flakes add fire resistance and insulation value, and permit greater flexibility and less asphalt fracture than granules in the case of roll material.

However, the mica flakes heretofore used as an exposable surfacing for composition roofing have been vulnerable to the attack of the elements and have permitted the attack of the underlying bitumen. The mica has often been soft and friable, and considerably moisture absorptive due to the laminations of the individual flakes being more or less separated by prior actions of nature. In exposure in freezing weather, these laminations have readily flaked or peeled off upon expansion of entrapped moisture. Moreover, due to their light transmitting properties, the flakes have made possible the passage of light rays destructive to bitumen. This contributes to accelerating shrinkage of the bitumen and loss of its volatiles and weakens the bond between the mica and the bitumen.

Furthermore, while mica flakes may be applied so as to overlap each other, there are not the excellent leafing properties in this material that I have found exist, for instance, with bronzing powders, possibly due to the lesser wetting properties of bitumen for mica. Consequently, I have found that where a surfacing of mica flakes is used, the bitumen may be exposed to a minute extent in a multiplicity of places. The use of very fine mica flakes (300 mesh) does not overcome this tendency. Mica as fine as this acts as a dust and does not adhere well to bitumen. In fact, in such form it also acts to chill the bitumen. Moreover, if mixed in substantial amounts with the larger flakes, the fines adversely effect the bond of the larger flakes. Obviously, these conditions further add to the vulnerability of the mica and bitumen layer of the roofing.

According to the present invention, it is proposed to overcome one or more of the aforesaid objections to the use of mica flakes as an exposable surfacing, and to provide composition roofing and siding and the like materials, with surfacings of overlapping flake material that will more effectively protect the roofing.

It is an object of the invention to provide roofing and siding material having surfacing comprising mica flakes bonded by an adhesive, for instance, bitumen, in which any of the exposed portions of the adhesive may be thoroughly protected by a further finely divided material peculiarly adapted to reach small crevices and the like, and that will substantially completely mask the underlying adhesive and readily bond thereto.

A further object of the invention is to provide roofing and siding with a surfacing of mica flakes having improved leafing properties.

A particular object of the invention is to provide roofing and siding with a surface to be weather exposed, comprising overlapping flakes of mica and of metallic bronzing powder.

A further object of the invention is to provide adhesive coated roofing and siding material with an exposed surfacing comprising individual mica flakes of opaque and closely laminated character, highly resistant to the transmission of light rays, yet substantially light reflective, said flakes having a more durable bond than ordinary mica flakes.

Another object of the invention is to provide roofing and siding with a surfacing of overlapping mica flakes, pieces or plates, wherein the individual mica elements have their laminated edges sealed to substantially prevent their delamination and peeling in exposure and to improve the insulation value thereof by edge sealing but not substantially filling the air cavities between laminations of the mica structure.

Another object is to provide a suction member as a means for applying particulate material to a base having an adhesive coating; also as a means to remove excess particulate coating substances from surfaced base material.

An additional object is to provide roofing and siding material with a micaceous surfacing, in which the individual pieces of mica have been rendered substantially light impervious by bonding thereto substantially light impervious coloring material, for instance, a layer of overlapping metallic pieces, for instance, those of a flake bronzing powder.

A further object of the invention is to provide roofing and siding having a bitumen bonded exposable surfacing comprising overlapping metallic flakes, which has distributed therethrough mica pieces serving to break up surface stresses in the bitumen, and resist accumulative expansion or contraction effects of the asphalt upon the metallic flakes.

These and other objects and features of the invention relating to the improved products and novel methods of producing the same and all its parts and combinations, will in part be obvious, and in part be pointed out in the following description of certain illustrative embodiments of my invention, which, however, must be considered as merely illustrating and in no way limiting my invention; and in the claims.

In accordance with the present invention, a suitable base material is surfaced with a multiplicity of mica flakes or plates such that the mica becomes bonded thereto. The base may be, for instance, a web of composition roofing which will have a facing of bitumen due to being saturated and/or coated therewith. The mica may, of course, be applied to a base having a further surfacing of granular material, for instance, crushed slate, crushed tile, ceramic granules, cement coated granules, etc., in which case the mica will adhere to the bitumen exposed between the granules. Moreover, the base saturant or coating material may be a substance other than a bitumen, for instance, a synthetic resin such as a vinyl or phenolic resin.

The flakes may be applied as by sprinkling or impelling them on the surface to be treated, this step being preferably followed by a pressing operation to more firmly anchor the flakes. A very desirable procedure is to brush the mica flakes, preferably in excess, over the surface to be treated, then press the flakes with a soft rubber roll and subsequently remove any flake material not bonded to the surface. However, I have discovered that particularly good results may be obtained by building up a measured layer of the mica flakes, preferably dry, upon a suction roll or other suction device having a facing such that the flakes will not be drawn into the suction chamber, for instance, a facing of very fine mesh material like silk, and to pass the face of the base to be treated one or more times into pressure contact with this mica faced member. In this operation, the outer layer of flakes will adhere to and be pressed into bond with the adhesive facing of the base material, which will have sufficient holding power to overcome the suction effect and no adhesive will be carried off by the flakes remaining on the roll.

The thickness of the mica layer or blanket on the suction member will ordinarily be any desired, that is, any within the suction possibilities and character of the member and the character and density of the flake material. Both thin and heavy layers have been obtained in practice. It will be understood that the thickness of the layer will be selected for the specific operation desired. For instance, where the suction member facing may be subject to injury by puncturing through of roofing granules previously applied to the base material, it is preferred that the mica blanket have a substantial thickness that will prevent puncture. Of course, such precaution may be obviated by a suitable resilient suction facing of good strength and wearing qualities, or by a rigid metallic suction facing. In certain instances, for example, where the granules have been applied but not pressed, the metal suction facing may be used with a proper thickness of flake material, and both these materials pressed by the facing to obtain a good bond.

The featured suction process of applying the mica flakes makes possible a uniform application of such material even over a facing of many projections, for instance, a facing of interspersed granules or one that is embossed. Moreover, it is possible thereby to equalize pressure against the base material, the flake material being sufficient to provide a cushioning effect when pressing. It will be understood that surfacing materials other than the mica flakes, may be handled by the featured suction process, and surfacing with such other materials is fully contemplated by this invention. For instance, the suction process may be used for applying metal powders, granulated cork, divided fiber, powdered resins, or even roofing granules themselves. The process is particularly valuable with materials such as granules that carry particles of dust known to impair or prevent good adherence of the granules to bitumen. The same is true of metallic flakes or powders wherein a metal dust problem is sometimes faced when extremely light metals are employed. By proper selection of the suction facing, the undesirable dust or fines may be removed through the facing or retained thereon and only the selected material be applied to the surface to be treated. The suction process also makes possible a practical method of applying the surfacing material in designs over a base material, it being merely necessary to mask such parts of the suction member facing as are not to carry the surfacing material. When the surfacing material is applied, it will adhere to the base in accordance with the pattern or design outlined on the suction member.

The mica flakes will preferably be applied as aforesaid, while the base coating is still plastic and/or adhesive. In the case of bitumen or other thermoplastic coatings, this will preferably be when the coating substance is hot and plastic, so that a good bond will be obtained by the flakes. Application of the flakes to a hot coating will also be preferable where the mica flakes, as will hereinafter be further explained, have themselves a further coating or treatment with a substance rendered adhesive by heat. It will be understood that the flakes may be applied for certain applications, to a base having a cold thermoplastic coating material and the surfaced base or web then be passed by suitable means through a heated tunnel or beneath a heating hood, either method being capable of transferring to the surface sufficient heat to bring about softening of the underlying coating and/or the coating the flakes may themselves carry, to a sufficiently adhesive condition whereby the mica pieces may be adequately anchored thereto with or without a further pressing operation. Moreover, it will be understood that the mica flakes will be applied by any of the foregoing methods such that they lie in overlapping relation.

The size of the mica flakes will be generally selected for the particular application to be made. Thus, where the flakes are to be applied to a base surfaced with mineral granules, I prefer that the pieces be somewhat smaller than where they are to be applied over an unsurfaced adhesive facing. I have found flakes of a size that will pass a 40 mesh screen and be retained on a 100 mesh screen to be satisfactory for nearly all purposes. Larger flakes may be employed but extremely fine mica flakes (smaller than 250 mesh) are to be generally avoided, for, as previously pointed out, they act as a dust, do not adhere well, and prevent adherence of larger flakes to coatings such as bitumen, which have low wetting properties and chill at the surface to form a film that must be penetrated to obtain anchorage.

A feature of the invention resides in applying metal particles, preferably in the form of flakes, generally referred to in the finer sizes as metal or bronze powders, for instance, of aluminum, bronze, or other weather and corrosive resistant metallic substances, to the mica surfaced base material, following removal of any excess mica and while the bonding coating, for instance, bitumen, is still in a plastic and/or adhesive condition, or has been brought to such a condition by extraneous heating or a solvent. Aluminum flakes are preferred since they retain their lustre and light reflective properties after slight oxidization and are of light weight. One or more of these substances may be applied over the mica surfacing, preferably in excess quantity. They readily adhere to any base bitumen exposed in the interstices between the mica pieces or any granules if they also be part thereof, but may be pressed by suitable means, if desired, to improve the bond. The size of the metallic flakes will be chosen for the particular application, but I have found that where the metallic flakes are to be utilized subsequent to the application of mica flakes, it is desirable that they be of a size finer than the mica flakes, particularly where the majority of the surfacing comprises mica flakes. I have discovered that metallic flakes of about 250 to 325 mesh, particularly the finer flakes, are extremely effective. For example, in one application where mica flakes of about 100 mesh size were used, good results have been obtained with metallic flakes of 325 mesh. The metal flakes possess great leafing properties, possibly because of electrical charges or the lubricant substance they sometimes carry as a result of processing. It has been found that they will penetrate even the smallest crevices, and coat the bitumen with which they come in contact, with a continuous layer of overlapping flakes. In fact, they not only cover the directly exposed bitumen but even extend to those portions of the bitumen which may be masked by mica flakes which are not directly bonded to the bitumen.

According to one method of applying the mica flakes and metallic powders, the mica flakes may be applied to the adhesive bitumen in a manner such that only such pieces as will adhere by contact will remain. Subsequently, after removal of the excess mica flakes which may be, for instance, by the suction member heretofore described, the bronzing powders will be applied in excess amount and the entire surface then pressed as by a roller, for instance, a soft rubber roller, to obtain a secure anchorage for the adherent mica flakes and such bronzing flakes as may cover the remaining exposed coating material it is desired to cover. The rubber roll permits pressure to be equalized and extended to the interstices between roofing granules, if the flake material be applied to a base already possessing such a surfacing. Obviously, both mica and metallic material may be applied by the suction member process above described.

It will be evident that the metal flakes enable me to completely shield the exposed areas of bitumen to be covered, with a layer of overlapping flakes. This could not be accomplished by the mica flakes alone. The presence of the metallic flakes is particularly valuable. They aid in preventing deterioration of the bitumen binder surrounding the micaceous material and make anchorage of these pieces and any roofing granules that may also be present, more permanent than would be the case where no metal particles were utilized to cover the remaining exposed bitumen. I have also discovered that the use of mica reduces, to a substantial extent, the accumulative expansion and contraction effects of the asphalt or other bitumen, and is therefore of particular value as an addition to a surfacing of metallic particles where it may be desired to cover the greater proportion of the bitumen surfacing with metallic flakes only.

The combination of mica flakes and metallic flakes further provides a means of obtaining novel ornamental effects by contrasting the natural color of the mica with a metal flake material of specific color. The possible effects will be further extended where colored roofing granules also form a part of the surfacing. The combination of mica flakes and metal flakes likewise provides a means of obtaining a durable roofing and siding material using a thin layer of asphalt coating material such as would ordinarily be pierced by the usual roofing granules were they utilized as the surfacing. The flakes, lying as they do in substantially flattened angular planes and in overlapping condition, do not require the depth of asphalt to obtain a secure anchorage that is necessary for roofing granules, and furthermore, may completely cover the surface to be treated.

In applying metal flakes, I may also mix with them any of the heat liquefiable solid or substantially solid binder substances and/or other solid aggregates disclosed in my copending application above referred to, the binder substances becoming fluid upon striking the hot base coating or upon becoming heated to a condition where they become fluid. My copending application also discloses that the metal flakes may be first treated with the solid binder substance and heated to produce, upon the metal flakes, a film of the binder. The present invention therefore also contemplates utilization of metal flakes of this character which may be applied to the base material alone or together with additional amounts of the extending materials disclosed in said prior application. By any of these procedures, the metal flakes will become bonded to the base adhesive and the bond will be materially improved by the added binder substance or film thereof attached to said flakes. The binder substance will also aid materially the anchorage of the mica flakes forming part of the surfacing and which lie adjacent the metal flakes. By having the temperature of the mica surfacing sufficiently high, the mica flakes, in addition to the exposed bitumen or other hot coating material, may be coated with the metal flakes, which will be bonded thereto by the binder substance. It will be understood that where the metal flakes, with their attached binder substance and/or additive binder, are applied in sufficient quantity to completely cover the mica surfacing, the entire face of the base thus treated will present a metallic layer.

The metal flakes may, however, be applied without such binder substances, and both the metal flakes and the mica flakes be further anchored and the mica additionally protected where desired, by treating the flake surfacing, after application, with an additional coating, for instance, the flake surfacing may be coated with any of the liquid coating compositions of a resin in a solvent described in the patent to Johnston, No. 2,060,083, granted March 10, 1936, preferably those which yield upon drying, a tough, flexible, weather-resistant, substantially water-insoluble and non-softening coating substantially unaffected by bituminous oils and adapted to expand and contract in relation to the other base layers without cracking. In general, the coating will be transparent or translucent to permit the underlying flake surfacing materials to show through the coating. However, it will be understood that the coating may include other extending materials, for instance, coloring pigments. It will also be understood that coatings of this character may be provided even where the metal flakes have been applied in conjunction with the heat liquefiable binders previously mentioned.

Since the application of a liquid coating material requires the dissipation of solvent and a lengthy operation where coating thicknesses of any extent are desired, I preferably utilize a pulverized coating material previously referred to and disclosed in my copending application Serial No. 236,789, which has the characteristic of becoming fluid and adhesive upon heating to temperatures sufficient to melt them and which will flow in and over the metallic and other surfacing material of the base to form a continuous film. Preferably, this film will be of a transparent or translucent character, but may, where desired, include any of the extending materials hereinabove referred to, for instance, metallic or mica flakes. It is desirable that the particulate coating substance be rapidly applied where the sheet is in a hot condition and of a temperature sufficient to cause instant melting of the coating material. Where the surface of the base includes roofing granules that it is desired not to coat with such substance, a binder substance will be selected that will not become fluid immediately on contacting the base, but which will collect in the interstices between the granules. Subsequently, the applied material will be brought to a temperature sufficient to melt it and a film will be formed in and around the granules and over such surfacing material as metallic flakes and mica as may exist in the interstices between the granules. It will be appreciated that many novel, ornamental effects may be obtained in this manner.

I have further discovered that a very novel structure may be obtained by the use of sufficient of the powdered solid coating material, and such may be used not only over a mica and/or metal flake and/or granule surfacing, but may also be utilized, for example, as a direct application to a bituminous coated base lacking any additional surfacing. As a typical example, I may, for instance, produce a structure that has the appearance of the cement coated roofing of my prior Patent No. 1,913,667. Thus, I may use a mixture of pulverized solid binder substance, for instance, a water white rosin of a size that will pass through a 60 mesh screen, and add thereto for coloring and added weather resistance, a quantity of titanium oxide and mica flakes of about 250 mesh in size. The amounts to be used may vary but I have found a good proportion to be about 50% by weight binder, 25% by weight of pigment, and 25% by weight of mica or other filler. A sufficient amount of this mixture, preferably in excess, will be applied cold to a hot base sheet, for instance, a hot bituminous composition roofing (50 lbs.) sheet, whose bitumen coating is preferably in a uniform level layer. The heat of the base will produce melting of the solid binder and the mixture will be fused as an integral layer to the base facing, whether it be the base bitumen or a facing of previously applied flake material such as mica or metal flakes. In the latter case, a certain amount of binder will filter through the flake layer to contact the bitumen. The sheet in this condition, and preferably after removing any excess mixture, is passed under a roll, preferably a smooth, soft rubber roll to spread the plastic mixture evenly over the bitumen. When desired, a parting material, for instance, mica flakes, metal flakes, titanium oxide, or calcium stearate, may be applied on top of the deposited mixture before rolling, to prevent sticking of the mixture to the roll. For obtaining surface effects, the face of the roll will have an appropriate raised design which will be impressed into the face of the melted coating upon rolling. Due to the nature of the coating mixture and its complete coverage of the bitumen as a uniform layer of sufficient thickness, the bitumen will not be brought through the coating by the embossing step.

In the cited example, I have obtained good results using about 10 pounds of the mixture to 100 sq. ft. of surface. It will be understood that under conditions, for instance, where solid binders of a higher melting temperature are utilized, or substantial thicknesses of applied mixture are used, external heat, which may be reflected heat or direct flame, may be provided to aid in fusing the mixture to the base. A novel surface effect may also be obtained by embossing or impressing the plastic coating with a roller made of a gang of discs, whose peripheries have been distorted. This will produce a series of ribs in the coating giving a grain effect. The coating may be additionally embossed to obtain a grid effect by passing the discs across the previously formed ribs. Alternatively, the base may be passed under an embossing roller having such cross rib effect. Where the coating material is applied to a granule surfaced base, the granules serve as a safety stop for making design impressions when embossing. This is desirable where light weight coatings are used.

The product produced by the foregoing example will have considerable rigidity but also possesses substantial flexibility with a major amount in a direction to place the coating under tension. Moreover, the coating layer will have a granular appearance much like a hydraulic cement layer, and will be white in color. The material may be painted with an oil paint or other surfacing materials where desired.

Where the mica flakes are utilized as the exposed protective surfacing, for instance, over bituminous coatings, I have found that the durability of the surfaced material may be greatly improved where the light transmitting character of the mica pieces has been substantially reduced or entirely eliminated. I have discovered that this may be accomplished without substantial loss in the light and heat reflective or insulating properties of the mica. For example, I have found it desirable to utilize off-color mica flakes having a greenish, amber, or even black cast, which reduces the light transmission of these flakes. Preferably, I use raw mica flakes containing iron as an impurity or accessory constituent or ingredient, and which have been heated or calcined in an oxidizing atmosphere, whereby they obtain a rich golden or bronze color or sheen that is substantially permanent and unaffected by age or exposure to the weather. The pleasing, opaque color and richness thereof produced by the treatment, is apparently due to the presence of sufficient amounts of the iron, generally not less than about 1% in the ferrous state of oxidization, but which, upon heating or calcining at a temperature of about 750° C. for about one and a half hours in the presence of air or other oxidizing atmosphere, is converted to the ferric state of oxidization by such processing. Micaceous materials of the character obtaining their color by this process are generally obtained from the micas proper, for instance, biotite, muscovite, phlogopite, and sericite; brittle micas, for instance, chloritoid; and chyorite micas, for instance, clinochlore. All these substances are characterized by a highly perfect basal cleavage (micaceous structure) and split easily into thin laminae or plates. I prefer those substances that, when treated in the foregoing manner, produce individual particles of the product that are comparatively hard and retain their color and size.

Mica pieces of the aforesaid character substantially prevent transmission of the destructive rays of light and thereby substantially prevent deterioration of underlying bitumen coatings such as asphalt, to which they may be anchored. Moreover, mica of this character, by reason of its desirable bronze or golden color, is particularly light and heat reflective, and simulates to a large degree, a continuous layer of overlapping metal flakes. Mica pieces of this character also lend themselves to blending or combination with metallic flakes, and it will be evident that a bituminous surfacing may be completely shielded from light by this combination. It is possible to obtain a surfacing of a single color effect by utilizing metal flakes of the proper color to cover any exposed asphalt between particles of the mica. Moreover, many color blends are also possible. The opaque mica pieces are preferably of a size between 8 mesh and about 100 mesh, dependent upon their color. It will be understood that changes in size vary the color effect that is produced. Moreover, particular coloring effects are obtainable where the percentage of iron is much higher than 1%, for instance, between 4% to 15%. Mica pieces of a blue or green or rust hue are obtainable in this manner. The treated mica is also almost two to three times as heavy as ordinary mica flakes, which run about 17 to 20 pounds to the cubic foot, and this additional weight aids in its application and anchorage to bitumen and the like.

To further improve the mica surfacing obtained, it is preferred that the micaceous pieces be treated in accordance with the teachings of my application Serial No. 302,671 filed of even date herewith, wherein it is proposed to treat the mica flakes or plates with a water-insoluble coating substance of weather-resistant character and substantially unaffected by bitumen oils, which will have the property of sealing the broken edges of the mica pieces to make such mica pieces resistant to the penetration of moisture and to delamination of their several layers in exposure. It has been discovered that where the mica pieces are treated with a heat softenable coating substance of the type disclosed in my copending application Serial No. 236,789, of which crushed rosin, or other resinous pine product, are examples, it will seal the voids or capillaries of the mica structure without filling them. A simple water test confirms this result. Uncoated mica pieces will sink in water, while pieces treated in accordance with this invention float. The novel treatment therefore greatly enhances the value of the flakes as insulation and as an exposed surfacing. Where the uncoated mica pieces are of a light transmitting character, such as the common variety of mica flakes, it is preferred that such coating include a pigment to render the micaceous material opaque. Where the uncoated mica pieces are of an opaque nature such as the treated mica flakes containing iron, heretofore referred to, the coating may be of a transparent and translucent character such as is obtainable with a pigmentless coating in order to permit the color effect of the mica to show through the coating.

Preferably, the coating material will be utilized to secure to each of the mica pieces a continuous layer of overlapping metal flakes of the character heretofore described, which are used to cover exposed bitumen and the like. In this manner, the micaceous pieces will be rendered light-proof and extremely weather resistant. They will likewise be given a very pleasing color and will provide a surfacing that is light and heat reflective and conductive at the surface. Mica treated pieces of this character also exhibit good bonding affinity for poor wetting coatings such as bitumen. They will be particularly desirable for insulation and ornamental purposes.

It will be evident that where the mica pieces have been treated with a coating substance, particularly a heat softenable resin, that the bond of the mica pieces to the base to which they are applied will be substantially improved, for upon contacting the hot bitumen or the like, fusion of the coating material with the bitumen will take place. It will also be evident that a surfacing of mica pieces of this character may include a further layer of metal flakes, the combination of the metal treated mica pieces and the further application of metallic flakes for masking minute exposures of bitumen bringing about a complete masking of bitumen which will add considerable insulation value and high heat and light reflective properties to the product. Obviously, the metallic flakes upon the mica pieces and those utilized as a fill-in surfacing, may be of contrasting color to obtain pleasing ornamental effects and the metallic coatings may also be utilized in conjunction with an exposed surfacing of roofing granules to obtain further desirable products. It will also be understood that the uncoated or coated opaque and/or metal treated mica may be applied as a mixture with a powdered binder and with or without other aggregates such as asbestos fiber or metal flakes. The raw mica pieces may also be coated with the liquid resin compositions above referred to, but I have found that these do not give a sealing effect that is the equal of that obtained by treatment with a heat liquefiable coating material.

It is a desirable feature of roofing and siding material to have the raw edges of the fibrous base material covered with a coating substance, for instance, bitumen. It is also desirable to form designs on the exposed facing of such material. I have discovered a novel and simple procedure whereby these results are obtainable. Thus, I have discovered that if a layer of parting material be applied over a layer of sufficient thickness of the plastic bitumen and the facing be gradually pressed or given a gradually increasing pressure, the plastic bitumen will flow over the raw edges of the base and coat them, while simultaneously the pressure will cause bonding of the parting material. The parting material may be the ordinary roofing granules but a layer of metal or mica flakes, preferably metal flakes, provides a much better parting layer for the pressure element, for instance, a roll, and permits pressure to be applied without the bitumen adhering to the roll. Moreover, the flake material may be applied in excess and a surfacing thereof will be carried along with the displaced bitumen so that the edges of the base will not only be covered by a bituminous layer but also by a layer of overlapping flake material. It will be understood that the pressure step may be performed following an application of both roofing granules and flake material. In that case, I preferably apply a measured amount of granules to the hot bituminous facing, permitting them to adhere by contact or by slight pressure. I then follow with flake material, applying the same in excess amount, and then press the facing to cause further embedment of the granules and flow of the asphalt and flake material over the edges of the base material. It will be understood that the suction roll above described may be used in any of these procedures, for instance, in the last mentioned one a suction roll carrying a sufficiently thick blanket of the flake material may be used in place of a loose application of such material.

A procedure similar to those above described, may also be practiced with previously fabricated blanks of mineral surfaced composition roofing by reheating the blanks sufficiently to make the bituminous coating material plastic and flowable, then applying an excess of metallic or mica flakes, and following this with pressure. I have found that a roller may be readily utilized for this step. I prefer using a soft faced roller as it gives better distribution of pressure and requires less pressure than a hard faced roll to obtain a seal of the bitumen between the granules, and to effect edge coating. Moreover, this character of roll substantially prevents puncturing of the felt by the roofing granules. Such a roll may be of rubber or will preferably be one carrying a blanket of the flake material of sufficient thickness, in which case the action of applying the flake material and pressing may be carried out in a single step.

The flake material of my invention, for instance, metal or mica flakes, is also adapted for producing various designs on the base material. Thus, I have already described one method utilizing the suction member of my invention for such purpose. Another method I have found desirable is to coat a base with hot asphalt, then apply roofing granules in excess quantity and roll these lightly to slightly embed the granules in contact with the bitumen. Following this step, I preferably remove the excess granules and while the bitumen is still plastic, I spread flake material, preferably metal flakes, over the granule surfaced sheet and press hard with a die or roller having a suitably raised surface delineating the desired design. In the areas of the design, the pressure will cause a flow of asphalt up between the granules; conversely, the granules in this area will be further embedded. However, the bitumen brought to the surface will be completely covered by the overlapping metal flakes. It will be understood that regular and mottled effects may be obtained by a proper selection of colors for the granules and flake material; also, that pressure may be applied unevenly, for example, to cause a flow of the bituminous coating from the center toward the side edges of the base to densify these regions with coating material. Various effects may also be obtained by spotted heating of the asphalt surface and irregular distribution of granules.

In the foregoing, where metal flakes that are susceptible to substantial oxidization are used without further protective films, I have found that if the surfaced base is subjected to heat treatment by radiation, the lighter oils of the bitumen may be brought to the surface to protect the metal flakes from oxidization. The films produced with such lighter oils do not produce undesidable discoloration but, in fact, improve the lustre of the metal flakes. The described treatment, moreover, renders the bond of the flakes more permanent.

A particular feature of the invention is directed to composition roofing and siding having a granule surfacing, the interstices only of which are covered over by a layer of overlapping metallic flakes or mica flakes which are rendered substantially impervious to light, and are substantially masked from view. This may be accomplished, for example, to a limited extent by applying a layer of roofing granules to a hot bituminous web, then applying flake material between the spaces and following this application with a layer of suitably graded granules of smaller size, which are forced down in between the larger granules. Subsequently, the entire surface is rolled. The finer granular material will pierce the flake layer to anchor to the bitumen and will tend to obscure the metallic or other flake material but will not entirely do so.

A more satisfactory masking of the flake material may be obtained, for example, as follows: A hot bituminous web is surfaced in the conventional manner with a quantity of granules of about a 10 mesh in size, the granules being applied in excess. The granules are made to adhere by contact or by a light pressure, and those not adhering are then removed. Thereafter, a continuous layer of fine flake material, preferably metal flakes, is applied in the interstices between the anchored granules. The excess of granules is first removed in order to avoid waste of flake material as many metallic flakes are processed with a lubricant which adheres as a film to the finished product and these would stick to the unsecured granules. The same condition occurs where the granules themselves have been oil treated prior to application to the roofing web. Removal of the excess granules also permits the metallic flakes to more readily reach the bitumen surfacing which they are to protect. Following application of the flake material, a controlled quantity of pulverulent resinous substance is worked down in between the granules in sufficient amount to cover the layer of flakes bonded to the bitumen and is caused to melt upon heating to form a continuous layer over the flakes. In order to mask the flake layer, the resinous material will preferably be of an opaque character or rendered so by the inclusion of a coloring pigment, for instance, chrome oxide, or other additional or substitute aggregate material, as slate dust, crushed brick, or marble dust. It will be understood that any of the solid binder substances referred to in my prior application Serial No. 236,789 above, may be utilized in this treatment; also, that the aggregates may be first fused with the resin, then recrushed and applied to the base material.

I have found that the color of the asphalt may be reproduced by utilizing as the resin aggregate, crushed graphite or a mineral substance known as ilmenite, which is also black in color and exceedingly stable under atmospheric conditions. These materials do not lose color when combined with resin and crushed after solidification of the mixture. Ilmenite, in its natural state, is in the form of a completely oxidized round pellet and may be crushed to a finely divided state, or, in fact, hammered out in the form of a flake. It is obtained from mineral deposits in California and has a chemical analysis including titanium dioxide 50.10%, silica 1.84%, and iron protoxide 46.08%, the balance being unrecovered. In fact, I have found that the crushed graphite or ilmenite may be used as a direct protective coating over the asphalt, the latter being preferred for such use.

Where a coloring aggregate is employed in the above resinous treatment of the metallic flake surface, I have found it possible to use as little at 5% of the resin and as high as 50% of coloring pigments, with good results. When desirable, the described mixture treatment may be followed by a further coating of a pulverulent mixture of additional resin and color.

I have further found that a desirable masking layer for the bitumen may be obtained by intimately mixing or grinding together metal flakes and graphite (natural or synthetic). An adsorption of graphite on the metal flakes is obtained when the graphite is the finer in size and the flakes take the lead-like color of graphite. Vice versa when the metal flakes are finer in size than the graphite, the latter particles are coated with the metal flakes and obtain the color of the metal flakes. In such case, a natural bond appears to take place between the two constituents, the reason for which is not at present clearly discernible but may be due to a film of stearate carried by the metal flakes as a result of their processing.

From the foregoing description of the products, methods, and apparatus of the invention, it will be evident to those skilled in the art that my invention is not limited to the various described embodiments and that many changes and modifications may be made in the details involved without departing from the scope and spirit of my invention, which is to be construed as broadly as the following claims taken in conjunction with the prior art, may allow.

I claim:

1. Building material comprising a base, coating material on said base and a weather exposed protective layer comprising discrete overlapping hard mica flakes bonded to and masking said coating in at least the portion to be exposed to the weather, said layer completely covering the coating in the area to be treated except for certain interstices occurring in application, and the coating material exposed in said interstices being covered by a further divided material of finer size than the mica and having good bonding properties with respect to said coating.

2. Building material comprising a base, and a weather surfacing comprising discrete overlapping mica flakes, the individual flakes carrying a substantially enveloping coating of fused resin, said coating sealing the mica flakes from moisture and bonding said flakes to each other end to said base.

3. Building material as claimed by claim 2, in which said enveloping coating is composed of pigment in addition to the resin.

4. Building material comprising a base, coating material on said base and an exposed layer of discrete overlapping mica flakes on said coating, said mica containing iron in the ferric state of oxidation and sufficient in amount to render said flakes substantially impervious to light transmission but substantially light reflective.

5. Building material as claimed by claim 2, in which said enveloping coating is composed of finely divided ilmenite in addition to the resin.

6. The method of providing base material with a weather protective masking layer comprising applying discrete mica flakes over the area of said surface to be treated in a manner such that adjacent flakes overlap and substantially cover said area, and subsequently applying discrete metallic flakes over the same area whereby to cover with overlapping metal flakes any said surfacing in said area left exposed by the mica flakes.

7. The method of applying a particulate substance to material having a surface in adhesive condition, comprising forming a blanket of the particulate substance by suction, bringing said blanket into contact with such adhesive surface to release the outer pieces of said particulate substance from said blanket by adherence to said surfacing, and removing the remainder of said particulate blanket.

8. The method of treating a base having an adhesive surface with a masking layer comprising discrete mica material, comprising applying discrete mica flakes to said surface in excess and such that the flakes in contact with said surface overlap each other, pressing said flake material, removing the excess mica, applying discrete metallic flake material of finer size than the mica, in excess on said mica layer, pressing said discrete metallic flakes such that they adhere in overlapping condition to any adhesive not covered by the discrete mica flakes in the area treated and removing the excess metallic flakes.

NORMAN P. HARSHBERGER.